United States Patent
Chishiki et al.

(10) Patent No.: US 10,549,525 B2
(45) Date of Patent: Feb. 4, 2020

(54) METHOD OF CORRECTING PRINTING MISALIGNMENT IN PRINTING APPARATUS

(71) Applicant: I. MER CO., LTD., Kyoto-shi (JP)

(72) Inventors: Mitomu Chishiki, Kyoto (JP); Masayuki Izume, Kyoto (JP)

(73) Assignee: I. MER CO., LTD., Kyoto-Shi (JP)

(*) Notice: Subject to any disclaimer, the term of this patent is extended or adjusted under 35 U.S.C. 154(b) by 135 days.

(21) Appl. No.: 15/555,974

(22) PCT Filed: May 18, 2017

(86) PCT No.: PCT/JP2017/018660
§ 371 (c)(1),
(2) Date: Sep. 6, 2017

(87) PCT Pub. No.: WO2017/221596
PCT Pub. Date: Dec. 28, 2017

(65) Prior Publication Data
US 2018/0264804 A1    Sep. 20, 2018

(30) Foreign Application Priority Data
Jun. 24, 2016 (JP) .................. 2016-125325

(51) Int. Cl.
*B41F 33/00* (2006.01)
*G06K 15/02* (2006.01)
*G06T 7/00* (2017.01)

(52) U.S. Cl.
CPC ........ *B41F 33/0081* (2013.01); *G06K 15/021* (2013.01); *G06K 15/027* (2013.01);
(Continued)

(58) Field of Classification Search
CPC ...... B41F 31/02; B41F 31/14; B41F 33/0036; B41F 33/0045; B41F 33/0081;
(Continued)

(56) References Cited

U.S. PATENT DOCUMENTS

| 5,056,430 A * | 10/1991 | Bayerlein | B41F 13/12 101/181 |
| 6,301,798 B1 * | 10/2001 | Liu | G03F 7/70633 33/645 |

(Continued)

FOREIGN PATENT DOCUMENTS

| DE | 10345290 | 4/2005 |
| JP | 03-282204 | 12/1991 |

(Continued)

OTHER PUBLICATIONS

Extended European Search Report for corresponding EP Application No. 17757456.3-1202, dated Jan. 7, 2019.
(Continued)

*Primary Examiner* — David H Banh
(74) *Attorney, Agent, or Firm* — Mori & Ward, LLP (57) ABSTRACT

Provided is a method of correcting printing misalignment in a printing apparatus that performs registration by using a printing misalignment inspection mark. This method is capable of improving registration accuracy and is capable of correcting the printing misalignment with higher accuracy. An image processor has printing misalignment value measurement means that measures a misalignment value with respect to a set position of the printing misalignment inspection mark that has been printed on an object. A printing misalignment inspection mark A is a hollow circle that is white inside, and the printing misalignment value measurement means measures the misalignment value with respect to the set position by using a white portion W of the printing misalignment inspection mark A.

20 Claims, 8 Drawing Sheets

(52) U.S. Cl.
CPC ........ *G06T 7/0002* (2013.01); *B41P 2233/52* (2013.01); *G06K 2215/0097* (2013.01); *G06T 2207/10004* (2013.01); *G06T 2207/30176* (2013.01)

(58) Field of Classification Search
CPC ............... G06K 15/021; G06K 15/027; G06K 2215/0097; G06T 7/0002; G06T 2207/10004; G06T 2207/30176; B41P 2233/52
See application file for complete search history.

(56) References Cited

U.S. PATENT DOCUMENTS

| | | | |
|---|---|---|---|
| 2004/0163562 A1* | 8/2004 | Lewis, Jr. ............ | B41F 33/0081 101/485 |
| 2006/0191437 A1* | 8/2006 | Mader .................... | B41J 11/46 101/485 |
| 2007/0170603 A1* | 7/2007 | Takahashi ............ | G02B 6/4224 257/797 |
| 2009/0304916 A1* | 12/2009 | Nakajima .................. | B41J 3/28 427/140 |
| 2012/0103255 A1* | 5/2012 | Fukuda ................. | C23C 14/042 118/668 |
| 2013/0328994 A1* | 12/2013 | Marttila ............... | B23K 26/032 347/225 |
| 2016/0229198 A1* | 8/2016 | Izume ................. | B41F 33/0045 |

FOREIGN PATENT DOCUMENTS

| | | | |
|---|---|---|---|
| JP | 2002-192701 | 7/2002 | |
| JP | 2003-25530 | 1/2003 | |
| JP | 2007-106042 | 4/2007 | |
| JP | 2015-63022 | 4/2015 | |
| WO | WO 2006/124829 A2 | 11/2006 | |
| WO | WO 2012/054655 A1 | 4/2012 | |
| WO | WO2015/046119 * | 4/2015 | ............ B41J 3/4073 |

OTHER PUBLICATIONS

International Search Report for corresponding International Application No. PCT/JP2017/018660, dated Aug. 8, 2017.

* cited by examiner

METHOD OF CORRECTING PRINTING MISALIGNMENT IN PRINTING APPARATUS

TECHNICAL FIELD

The present invention relates to a method of correcting printing misalignment in a printing apparatus.

BACKGROUND ART

A printing apparatus known in the art includes: an imaging device that takes an image; and an image processor that processes the taken image. Such a printing apparatus performs inspection for print defect, poor appearance such as stain, and the like, and changes print condition on the basis of the results of the inspection, thereby improving printing accuracy.

Patent Literature 1 discloses an image processor having printing misalignment value measurement means that measures a misalignment value with respect to a set position of a printing misalignment inspection mark that has been printed on an object. According to Patent Literature 1, a printing misalignment inspection mark is printed on an object such as a can, and the position of the printing misalignment inspection mark that has actually been printed is detected, whereby registration is performed.

CITATION LIST

Patent Literature

Patent Literature 1: JP-A-2015-063022

SUMMARY OF INVENTION

Technical Problem

According to a printing apparatus disclosed in Patent Literature 1, accuracy of the printing misalignment inspection mark is crucial. In the case where the printing misalignment inspection mark is printed as a perfect circle in conformity with setting, there arise no problems. However, in actual cases, a margin is to be added to a circle having a size as set, which causes a reduction in accuracy of the determination of a center position of a printing misalignment, and in turn causes a problem that accuracy of correcting misregister is deteriorated.

An object of the present invention is to provide a method of correcting printing misalignment in a printing apparatus that performs registration using a printing misalignment inspection mark, which is capable of improving registration accuracy and is capable of correcting the printing misalignment with higher accuracy.

Solution to Problem

A method of correcting printing misalignment in a printing apparatus in accordance with one aspect of the present invention is a method of correcting printing misalignment in a printing apparatus, the printing apparatus comprising: a printer having a plurality of plate cylinders for printing different colors, the printer configured to perform printing on an object; an imaging device configured to take an image that has been printed on the object; and an image processor configured to process the taken image, the image processor having printing misalignment value measurement means configured to measure a misalignment value with respect to a set position of a printing misalignment inspection mark that has been printed on the object, wherein the printing misalignment inspection mark is a hollow circle that is white inside, and the printing misalignment value measurement means measures the misalignment value with respect to the set position by using a white portion of the printing misalignment inspection mark.

A printing misalignment inspection mark used conventionally is a solid filled circle, whereas the present invention uses a hollow circle that is white inside as the printing misalignment inspection mark. In the present invention, by using the white portion of the printing misalignment inspection mark, a misalignment value with respect to a set position is measured. In the case where the printing misalignment inspection mark is a solid filled circle as in the conventional case, accuracy of measuring the position of a printing misalignment inspection mark that has been printed is deteriorated due to a margin generated in an outer circumferential portion of the printing misalignment inspection mark. In contrast, the present invention is not subject to influence of the margin, is capable of measuring the position of the printing misalignment inspection mark that has been printed, and therefore improves registration accuracy greatly.

The size of the white portion occupies, in size, 30% to 70% (more preferably, 40 to 60%) of the diameter of the print portion. Specifically, for example, the size of the print portion is 0.5 mm in diameter, and in this case, the size of the white portion is 0.2 to 0.3 mm.

Providing the white portion reduces ink amount of the printing misalignment inspection mark to be used, whereby an effect that a marginal portion decreases is also obtained.

Preferably, the printing misalignment value measurement means determines a position and a size of the marginal portion by using the circular print portion that is located outside the white portion of the printing misalignment inspection mark.

The position and the size of the marginal portion is subject to influence of pressure of the plate cylinder, ink amount, temperature, and the like. Therefore, by detecting and monitoring the marginal portion, information as to whether the print condition is appropriate or not may also be obtained, whereby improvement of the print quality is achieved.

The printing apparatus to which a method of correcting printing misalignment in a printing apparatus in accordance with the present invention is not particularly limited, and an object to be printed may be paper or a can. In offset printing that is performed on cans, improvement of registration accuracy has been an issue to be solved. The method of correcting printing misalignment in a printing apparatus in accordance with the present invention exerts its effect more when objects to be printed are cans.

Advantageous Effects of Invention

As described above, the printing apparatus in accordance with the present invention is capable of measuring the position of the printing misalignment inspection mark that has been printed, without being subject to the influence of the margin, is capable of improving accuracy of measuring the position of the printing misalignment inspection mark, and is capable of greatly improving registration accuracy.

REFERENCE SIGNS LIST (1) printing apparatus
(2) printer
(47) plate cylinder
(52) imaging device
(53) image processor
(56) printing misalignment value measurement means
(A) printing misalignment inspection mark

DESCRIPTION OF EMBODIMENTS

Hereinafter, embodiments of the present invention will be described with reference to the drawings.

Figure 2:
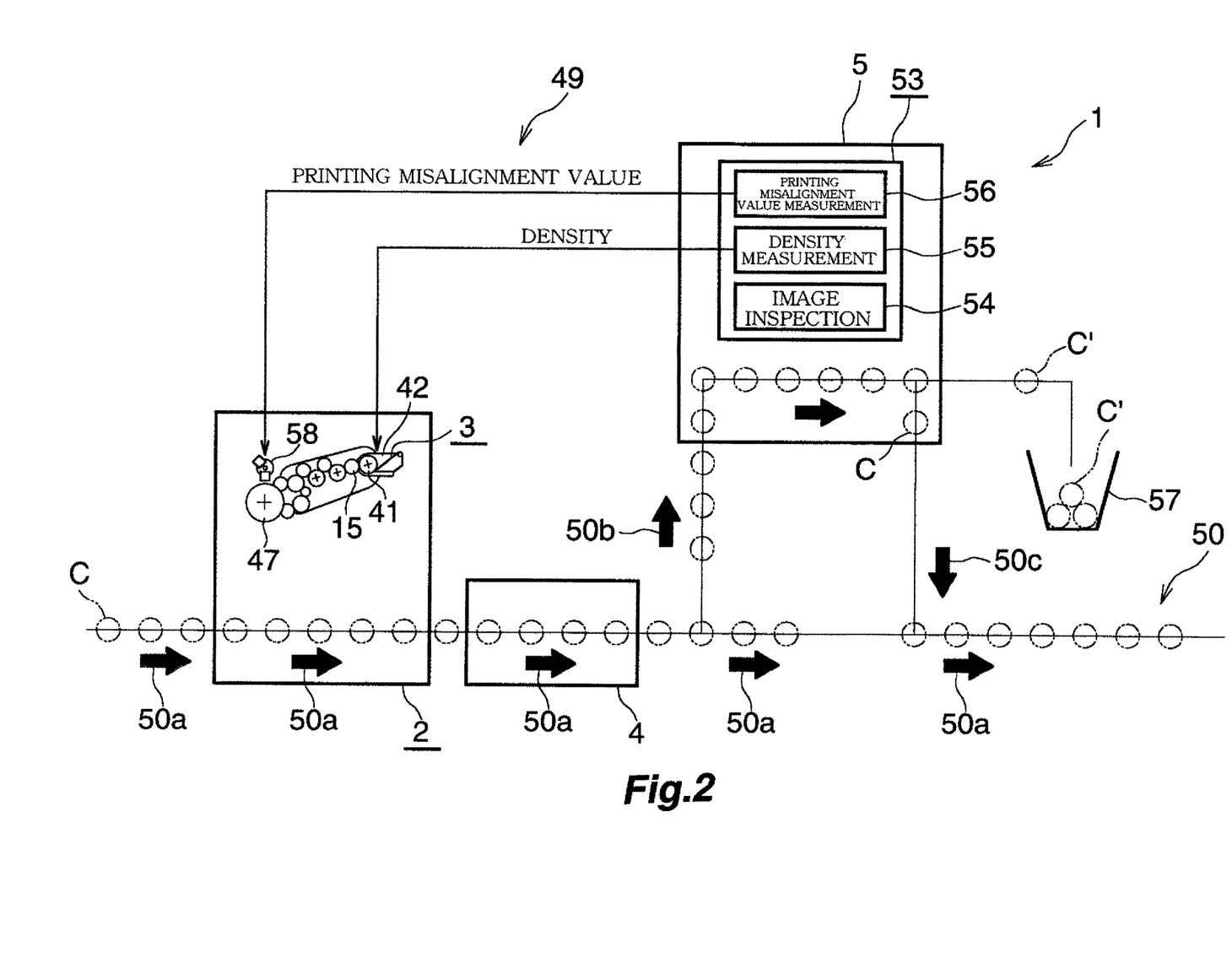
FIG. 2 is a block diagram showing an example of the printing apparatus to which the method of measuring the printing misalignment value in the printing apparatus in accordance with the present invention is applied.

FIG. 2 shows an example of a printing apparatus (1) to which a method of correcting printing misalignment in a printing apparatus in accordance with the present invention is applied. The printing apparatus (1) includes a printer (2) for performing printing on cans (C), a drier (4) for drying printed surfaces of the cans (C) after the printing, an inspection device (5) for inspecting print states of the printed surfaces, and a conveyance device (50) for conveying the cans (C).

The printer (2) performs printing on a cylindrical can body (a body of a two-piece can, which will be hereinafter referred to as merely a can (C)) that is open at a top thereof. The printer (2) includes a plurality of plate cylinders (47) having plates for printing different colors respectively, ink supply devices (3) for supplying ink to the respective plate cylinders (47), and registration devices (58) for performing positional adjustment (registration) of the plate cylinders (47).

The cans (C) are transferred to a downstream side through the drier (4) after being printed in the printer (2). Print states of part of a large number of cans (C) having passed through the drier (4) are inspected in the inspection device (5).

The conveyance device (50) includes a main line (50a) for supplying the cans (C) to the printer (2) and transferring the printed cans (C) to the downstream side, a sampling line (50b) for transferring part of a large number of cans (C) having passed through the drier (4) to the inspection device (5), and a return line (50c) for returning the cans (C) determined as good products in the inspection device (5) to the main line (50a).

In the inspection device (5), the can (C) is rotated by a rotation device (51) described below, a drive side of the rotation device (51) and the can (C) on a driven side of the rotation device (51) are synchronized through a rotary encoder (60), an image is taken by an imaging device (52), and the taken image is processed in an image processor (53).

As the image processor (53) that processes the taken images, the inspection device (5) is provided with: image inspection means (54); density measurement means (55); and printing misalignment value measurement means (56). Cans (C) determined as good products in the inspection device (5) are returned to the main line (50a) as described above, and cans (C') determined as inspection rejected products in the inspection device (5) are discharged to an inspection rejected product storage part (57).

Density obtained by the density measurement means (55) in the inspection device (5) and a printing misalignment value obtained by the printing misalignment value measurement means (56) in the inspection device (5) are fed back to the printer (2). In the printer (2), an ink supply amount is adjusted by a controller according to the density, and a plate cylinder position is adjusted by an automatic registration device (58) according to the printing misalignment value.

Figure 3:
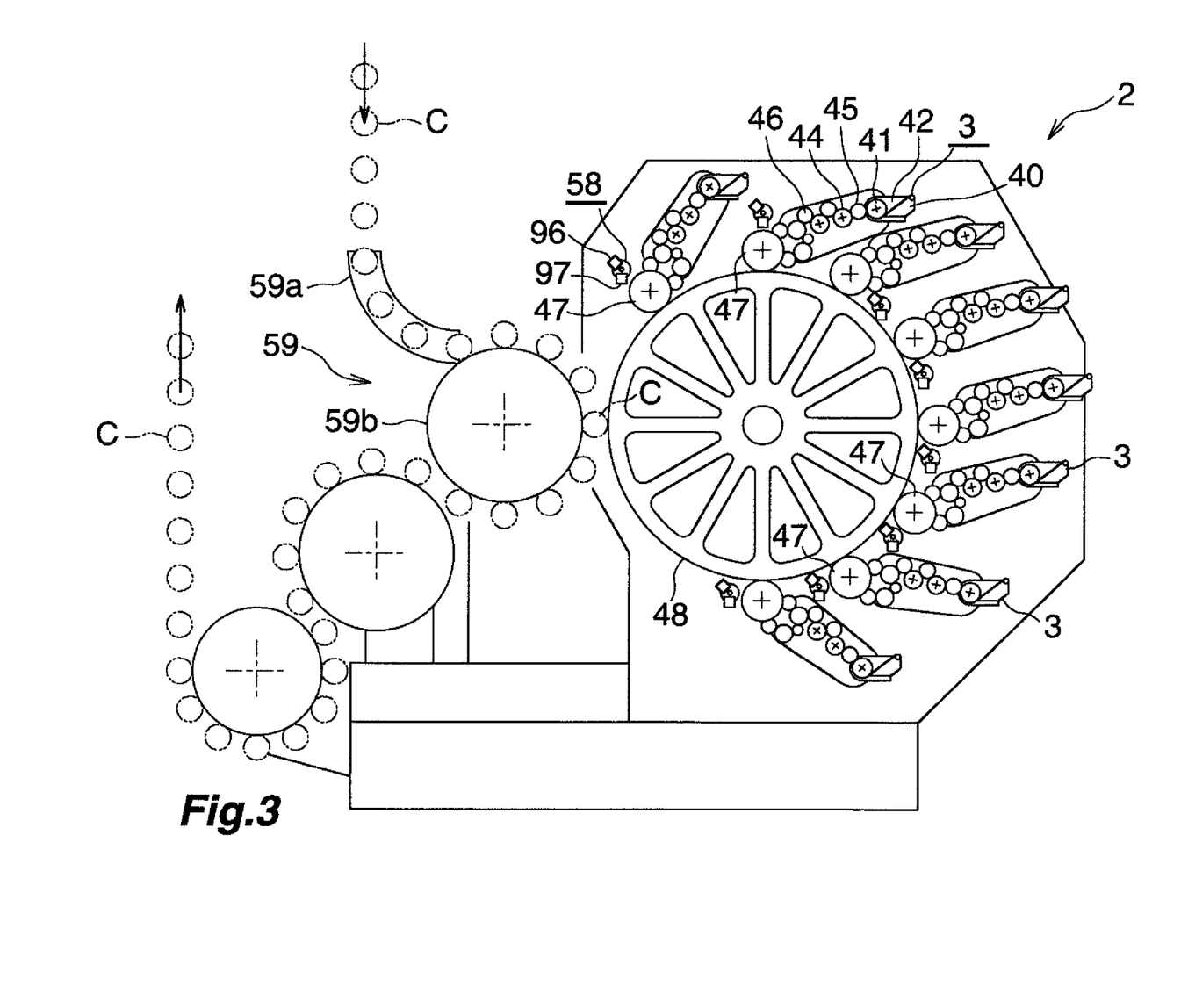
FIG. 3 is a side view showing a printer.
Figure 4:
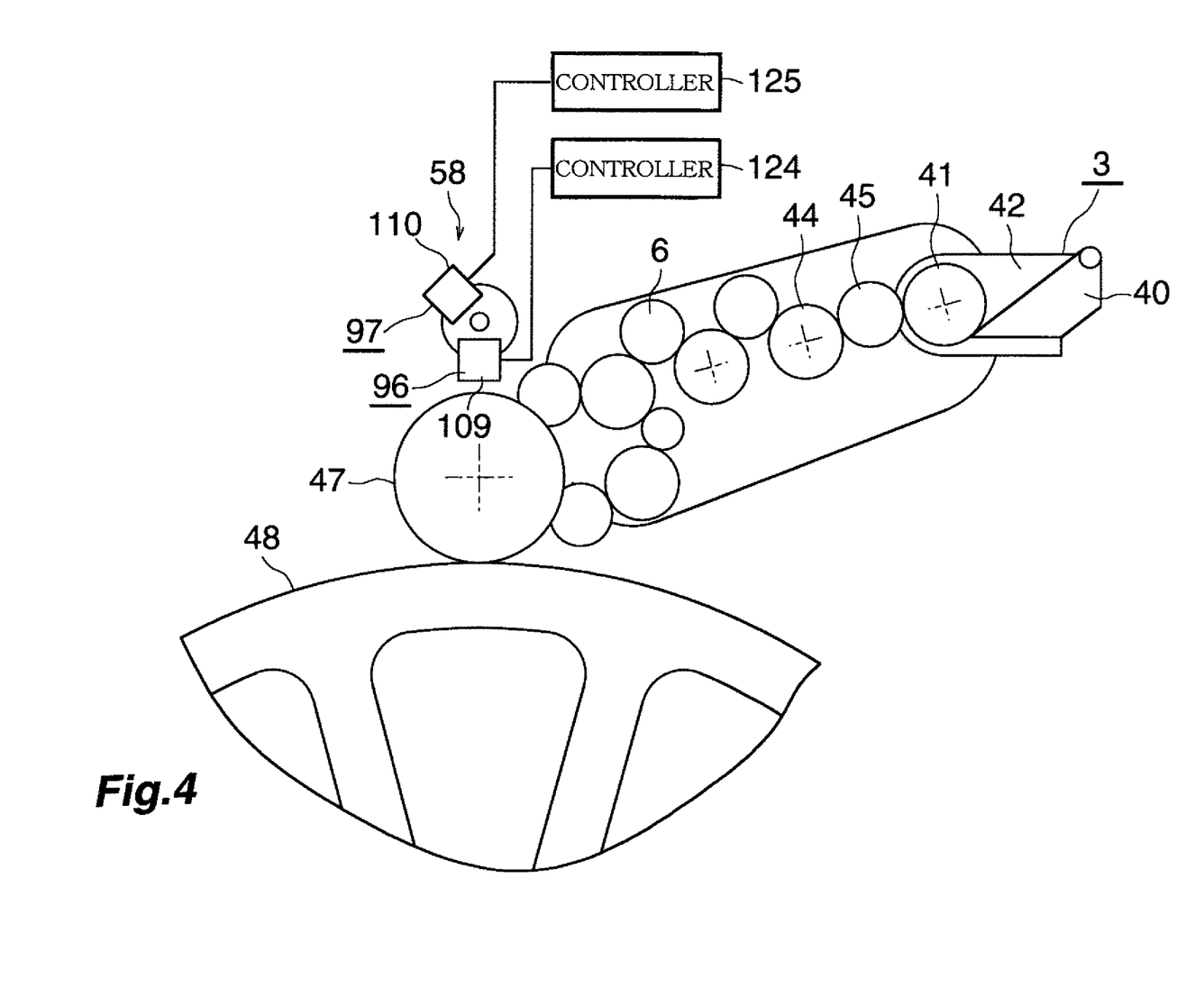
FIG. 4 is an enlarged side view of a main part of the printer.

As shown in FIG. 3 and FIG. 4, the printer (2) includes the plurality of (eight in the drawing) plate cylinders (47) having plates for printing different colors respectively, a blanket cylinder (48) performing printing on the cans with ink being transferred from the plate cylinders (47), the ink supply devices (3), the registration devices (58), and a can feeding device (59) having a plurality of can feeding rollers (59a) and can feeding chutes (59b).

The registration device (58) includes: axial direction moving means (96) for moving the plate cylinder (47) in the axial direction; and circumferential direction moving means (97) for moving the plate cylinder (47) in the circumferential direction. As shown in FIG. 4, the registration device (58) is provided with controllers (124), (125) for controlling motors (109), (110) provided in the respective moving means (96), (97).

In the ink supply device (3), an inkwell roller (41) is placed so as to be close to a rear end portion of an inkwell member (40), whereby an inkwell (42) is formed. An ink passage having a predetermined gap between the rear end portion of the inkwell member (40) and the surface of the inkwell roller (41), is formed.

A first ink distributing roller (44) of a plurality of ink distributing rollers (44), (46) is placed in the rear direction of the inkwell roller (41). An ink transfer roller unit (45) is placed between the inkwell roller (41) and the first ink distributing roller (44) so as to be close to both rollers (41), (44). Although not shown, the ink transfer roller unit (45) is an aggregation of a plurality of ink transfer rollers that are arranged as divided in the axial direction of the rollers (41), (44), (46), and these ink transfer rollers are arranged at small intervals in the axial direction.

In the printer (2), ink is transferred by switching the position of a required ink transfer roller of the ink transfer roller unit (45) at transfer timings of predetermined intervals, and a rotation angle (contact rotation angle) of the inkwell roller (41) made from a contact with the inkwell roller (41) until a separation from the inkwell roller (41) is controlled in each ink transfer roller, by the controller. By this configuration, a peripheral length of ink that is transferred from the inkwell roller (41) to the required ink transfer roller is controlled. As a result, the amount of ink supplied to the printed surface is adjusted according to the position in the width direction.

The control of the contact rotation angle is performed by controlling a period of time (contact instruction period) from an output of contact instruction (an output of an instruction, to the ink transfer roller, for switching to a transfer position)

until an output of non-contact instruction (an output of an instruction, to the ink transfer roller, for switching to a non-transfer position).

In the case where the density of a certain color among eight colors is low, the contact period of the color in the ink supply device (3) is elongated, and in the case where the density of a certain color among eight colors is high, the contact period of the color in the ink supply device (3) is shortened, whereby the density is controlled.

In the registration device (58), the controller (124) for controlling the first motor (109) adjusts an axial direction position of the plate cylinder (47) by driving the first motor (109) in accordance with a printing misalignment value of a can (C) in a height direction thereof in the printing misalignment value measurement means (56) of the inspection device (5). The controller (125) for controlling the second motor (110) adjusts a circumferential direction position of the plate cylinder (47) by driving the second motor (110) in accordance with a printing misalignment value of a can (C) in a circumferential direction thereof in the printing misalignment value measurement means (56).

Figure 5:
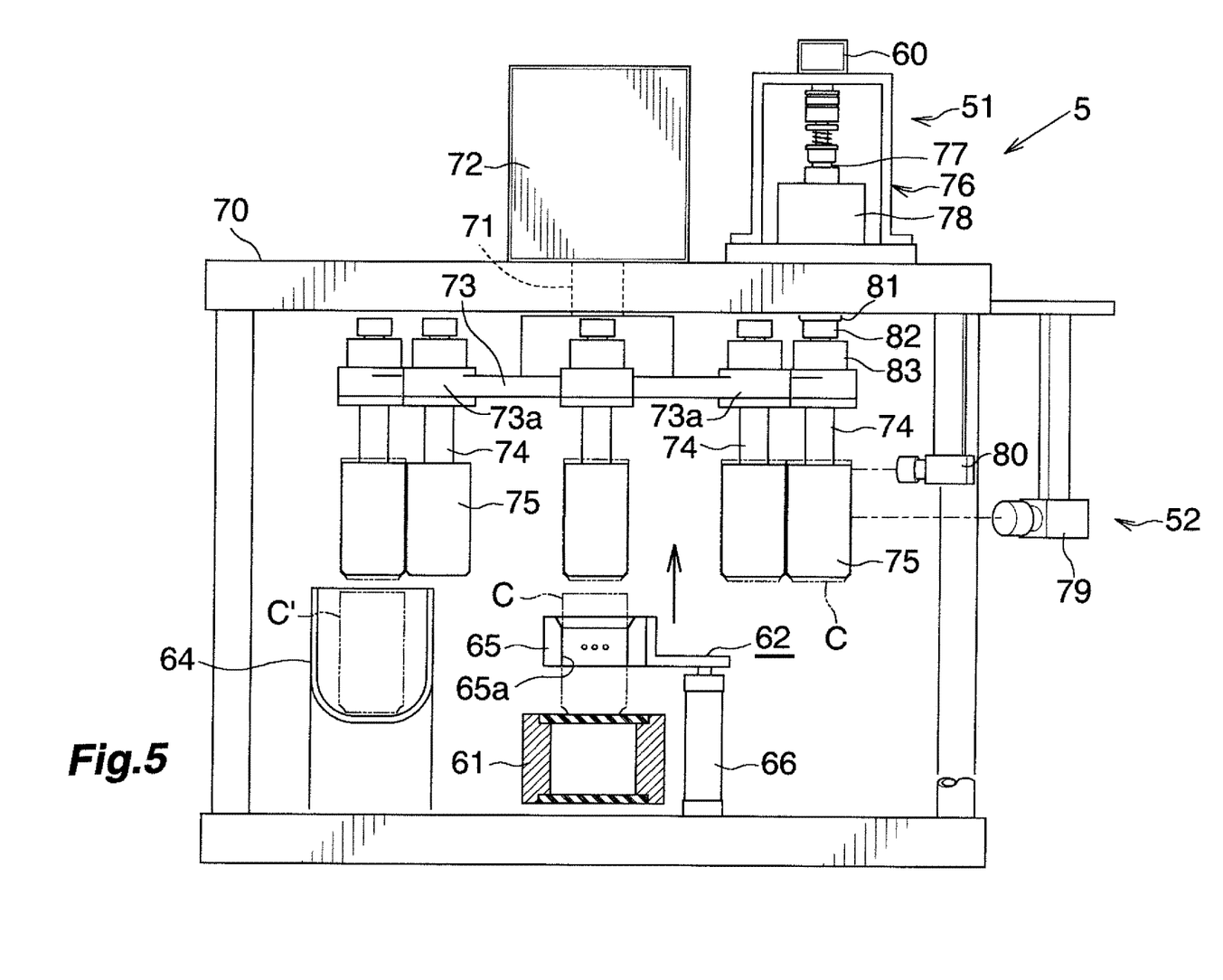
FIG. 5 is a front view of an inspection device.

As shown in FIG. 5, the inspection device (5) includes: a loading conveyor (61) for sequentially loading cans (C) for inspection; a take-out device (62) provided at an end part of the loading conveyor (61) and for taking out the cans (C) for inspection from the loading conveyer (61); a rotation device (51) for holding and rotating the cans (C) for inspection taken out in the take-out device (62); the imaging device (52) for taking images of the cans (C); a controller (not shown) formed of a computer having a CPU executing logical operation of the image processor (53) described above, a ROM for storing control programs, a RAM for storing data and so on, a display displaying image processing results, and so on; an unloading conveyor (not shown) provided in the front direction of the loading conveyor (61) and for unloading cans (C) as good products; and a discharge chute (64) for discharging cans (C') as inspection rejected products.

The take-out device (62) includes a suction part (65) adsorbing cans fed by the loading conveyer (61) and pushed out, and a cylinder part (66) for moving the suction part (65) upward. The suction part (65) has a semi-cylindrical concave portion (65a) to which an intermediate portion of the can (C) is fitted.

The rotation device (51) includes a main shaft (71) rotated by a motor (72) and a rotating disk (73) attached to the main shaft (71). The motor (72) is attached to an upper surface of a top wall of a housing (70), and the main shaft (71) is rotatably supported at the top wall of the housing (70).

The rotating disk (73) is concentric with the main shaft (71), rotating integrally with the main shaft (71). In an outer periphery of the rotating disk (73), a plurality of arms (73a) are provided so as to protrude outward in a radial direction at equal intervals. Vertical driven side rotating shafts (74) are supported at respective arms (73a) of the rotating disk (73) so as to rotate freely. Holding members (75) formed concentrically with the driven side rotating shafts (74) so as to hold the cans (C) by suction are attached to the driven side rotating shafts (74).

The driven side rotating shafts (74) revolve around the main shaft (71) through the set position of the take-out device (62), the set position of the imaging device (52), the set position of the unloading conveyor, and the set position of the discharge chute (64), with the rotation of the rotating disk (73), so as to return to the set position of the take-out device (62).

A driving device (76) for rotating (revolving) the driven side rotating shaft (74) is placed above the driven side rotating shaft (74) positioned in the set position of the imaging device (52) so as to be supported on the top wall of the housing (70). The driving device (76) includes: a vertical drive side rotating shaft (77); a motor (78) provided in concentric with the drive side rotating shaft (77) and for rotating the drive side rotating shaft (77); and a rotary encoder (60) for detecting a rotation speed (rotation angle) of the drive side rotating shaft (77).

As the imaging device (52), a first camera (79) for taking an image of the entire can and a second camera (80) for taking an image of an opening-side end portion of the can are used. The image taken by the first camera (79) is used in the image inspection means (54) and the density measurement means (55). The image taken by the second camera (80) is used in the printing misalignment value measurement means (56).

The holding member (75) is made of resin and has a cylindrical shape. The holding member (75) is provided, in a lower end portion thereof, with a cylindrical suction chamber (not shown) opening downward. The suction chamber becomes under negative pressure (vacuum) whereby the holding member (75) holds the can (C) by suction.

In the set position of the imaging device (52), the drive side rotating shaft (77) faces the driven side rotating shaft (74) in the axial direction, and magnets (81), (82) applying attracting forces to each other are fixed to a lower end portion of the drive side rotating shaft (77) and an upper end portion of the driven side rotating shaft (74). Accordingly, a lower surface of the magnet (81) provided at the lower end of the drive side rotating shaft (77) and an upper surface of the magnet (82) provided at the upper end of the driven side rotating shaft (74) are adsorbed (integrated) by respective attracting forces of the magnets (81), (82).

The driven side rotating shafts (74) are supported by cylindrical casings (83) provided at respective arms (73a) of the rotating disk (73) so as to rotate and so as not to move in the axial direction.

The drive side rotating shaft (77) rotates by being driven by the motor (78). Along with this rotation, a can (C) held by the driven side rotating shaft (74) rotates, and an image of the can for one rotation is captured by the imaging device (52). At this time, in order to eliminate an error, a period for one pixel is determined so as to correspond to an output of the rotary encoder (60).

The rotation of the can (C) and the rotation of the rotary encoder (60) (rotation of the drive side rotating shaft (77)) are rotated so as to be synchronized with each other for eliminating the error. This synchronizes an output (pulse) of the rotary encoder (60) and the flow of the image for one pixel. Accordingly, even when an uneven rotation occurs in the respective cans (C) to be measured, taken images of the respective cans (C) are not extended/contracted whereby stable inspection is performed.

The image inspection by the image inspection means (54) of the inspection device (5) is performed in a conventional manner, in which a master image and a taken image are compared pixel by pixel by the image inspection means (54) whereby inspections are performed for a partial lack, a stain due to ink scattering, and so on, in the image. In the image inspection means (54), a product having a lack with a size exceeding a predetermined size is determined as an inspection rejected product, and a product with a misalignment value exceeding a misalignment allowable value with respect to the master image is also determined as an inspection rejected product.

Figure 6:
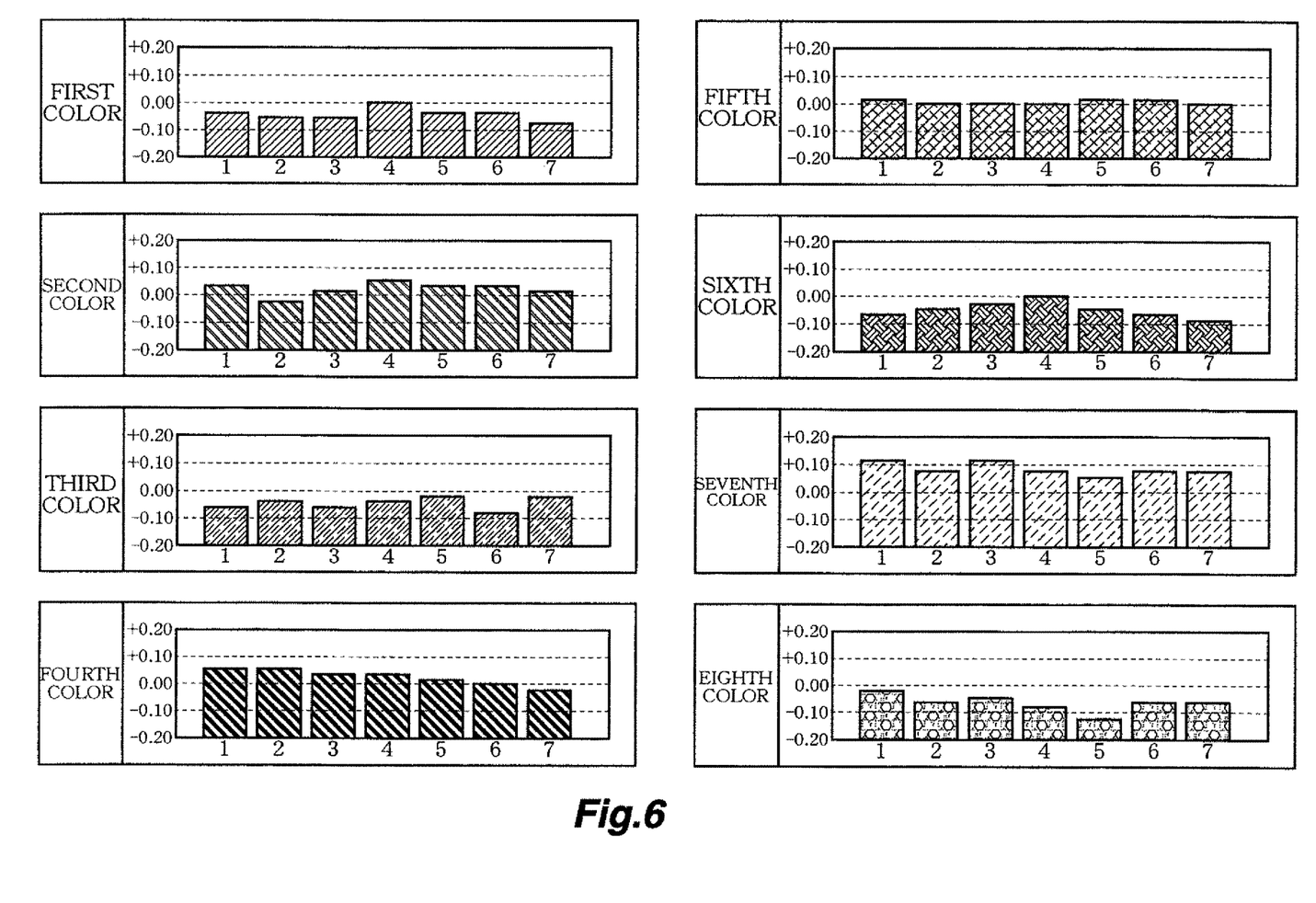
FIG. 6 is a diagram showing density data obtained from the inspection device.

Single-color solid portions are inspected by the density measurement means (55) of the inspection device (5). That is, as it is difficult to measure the density at a place where a plurality of colors overlap, places where single-color solid portions exist are designated in advance for respective colors, and densities at the designated places (density measuring places) are measured. A density value may be calculated as an arithmetic mean value of RGB components of pixels defined as the density measurement place, and can be obtained as a density difference between the density at each place and the density of the master image. In the case where the single-color solid portion has, for example, a size of 0.8 mm×0.8 mm, the density can be measured. When it is difficult to measure the density accurately because the above-described size cannot be secured or for other reasons, whether or not the density difference from the master image is within a reference is just determined. As shown in FIG. 6, for one color, densities are measured at places, with the number of the places being equal to the number (e.g. seven) of the ink transfer rollers (15). In this embodiment, since the number of colors (the number of the plate cylinders) used is eight, density measurement values at 8×7 places are obtained. The density measurement results shown in FIG. 6 are displayed on the display of the inspection device (5).

The controller of the ink supply device (3) controls the contact period in the ink supply device (3) based on a density target value that is previously set, and the density measurement results obtained in the density measurement means (55) of the inspection device (5) are added to the control. Specifically, when the density of a certain color is lower than a target value at a certain place, a contact length between the ink transfer roller supplying the color to the place and the inkwell roller is elongated, whereby the density is increased; and when the density of a certain color is higher than a target value at a certain place, the contact length between the ink transfer roller supplying the color to the place and the inkwell roller is shortened.

In the example shown in FIG. 6, for example, the density is relatively high at a place of No. 4 and is relatively low at a place of No. 7, for the first color. For the second color, the density is relatively high at a place of No. 4 and the density is relatively low at a place of No. 2. When such density measurement results are outputted to the printer (2), in the controller of the ink supply device (3) of the printer (2), for example, the contact length between the ink transfer roller No. 4 that supplies ink to the plate cylinder for the first color and the inkwell roller is shortened, and the contact length between the ink transfer roller No. 7 that supplies ink to the plate cylinder for the first color and the inkwell roller is lengthened, based on the input of the density measurement results. Accordingly, the density of the first color is changed to be uniform as a whole. The same process is performed for other colors.

The density measurement results in the inspection device (5) are fed back to the printer (2) immediately as described above, and the positions of respective ink transfer rollers (15) are controlled by the controller of the ink supply devices (3) whereby the amount of ink to be supplied is changed. Accordingly, the density can be corrected before a defective product in density is caused, which can prevent generation of the defective product in density.

Concerning cans (C) to be inspected by the inspection device (5) described above, printing misalignment inspection marks are printed for respective colors on the opening-side end portion of the can (C). That is, as shown in FIG. 7(a), on the printed surface of the can (C), the printing misalignment inspection marks shown by "A" are added at a portion that are hidden by a lid of the can (2) as a final product, in addition to required indication items, such as a product name, a company name, ingredients, and a bar code.

Figures 7A, 7B, 7C:
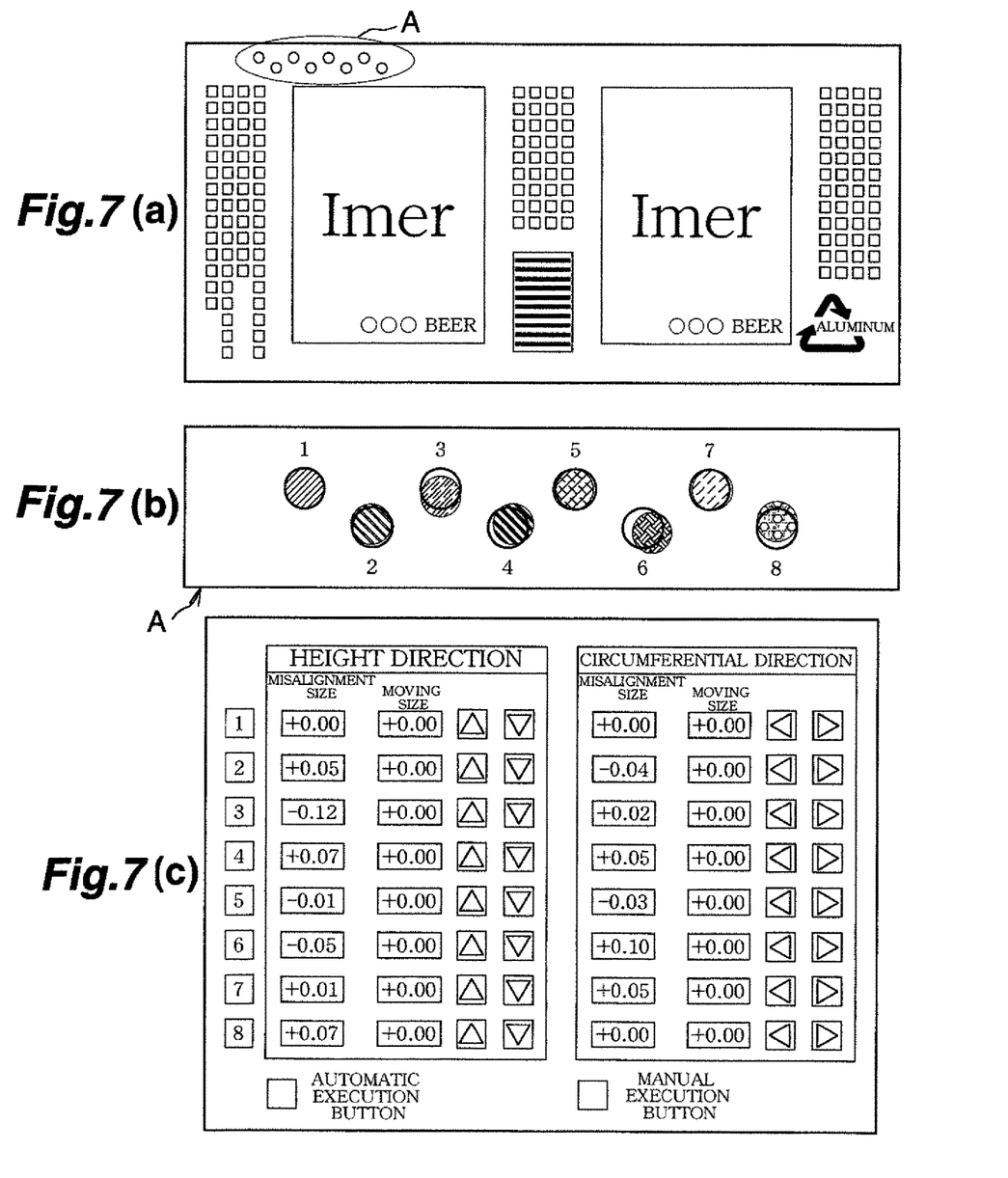
FIGS. 7(a), 7(b), and 7(c) are diagrams showing printing misalignment values obtained from the inspection device.

The printing misalignment inspection marks (A) are provided for a total of eight colors from No. 1 to No. 8, as shown in FIG. 7(b) in an enlarged manner. Positions shown by solid lines in the drawing are reference positions (positions of designation marks in the master image), and positions shown by two-dot chain lines in the drawing are positions obtained from the taken image, for respective colors. According to the drawing, it is found that, for example, a printing misalignment value is extremely small for color No. 7, a printing misalignment value in the height direction of the can (C) is large for color No. 3, and a printing misalignment value in a circumferential direction of the can (C) is large for color No. 6. The printing misalignment value is calculated as a value indicating how many pixels (or how long in millimeters (mm)) the position of the designation mark in the master image is deviated from the position of the designation mark in the taken image. The calculated numerals are displayed on the display of the inspection device (5) as shown in FIG. 7(c). The printing misalignment values are calculated for the height direction of the can (axial direction of the plate cylinder (47)) and for the circumferential direction of the can (circumferential direction of the plate cylinder (47)), respectively. Each of the printing misalignment inspection marks (A) is a circle in shape having a diameter of 0.5 mm, for example. Adjacent printing misalignment inspection marks (A) are arranged so as to deviate from one another by predetermined distances both in the height direction of the can and in the circumferential direction of the can (for example, 0.5 mm in the height direction of the can, and 2 mm in the circumferential direction of the can).

The printing misalignment value of the can (C) in the height direction is fed to the controller (124) that controls the first motor (109) of the registration device (58), and the controller (124) drives the first motor (109) in accordance with the printing misalignment value, thereby automatically adjusting the position of the plate cylinder (47) in the axial direction. The printing misalignment value of the can (C) in the circumferential direction is fed to the controller (125) that controls the second motor (110) of the registration device (58), and the controller (125) drives the second motor (110) in accordance with the printing misalignment value, thereby automatically adjusting the position of the plate cylinder (47) in the circumferential direction.

As described above, the printing misalignment value measurement results in the inspection device (5) are immediately fed back to the printer (2), and the positional adjustment (registration) of the plate cylinder (47) is performed by the registration device (58). Accordingly, the printing misalignment value can be corrected before a defective product with printing misalignment is caused, which can prevent generation of the defective product with printing misalignment.

It should be noted that the printing misalignment value measurement results may be fed back to the printer (2) without using a controller (i.e. manually).

Regarding the printing misalignment inspection mark (A) that is specified to be a circle having the diameter of 0.5 mm as described above, if the printing misalignment inspection mark (A) that is actually printed is a perfect circle having the diameter of 0.5 mm, the center position of the circle is detected with high accuracy. By using this center position, amendment with high accuracy becomes possible. That is, as shown in FIG. 8(a), if B is the actual position whereas Q is the set position, the positional adjustment of the plate cylinder (47) in the axial and circumferential directions may be performed by controlling the first motor (109) and the second motor (110) of the registration device (58) so as to cause B to come closer to Q.

Figure 8:
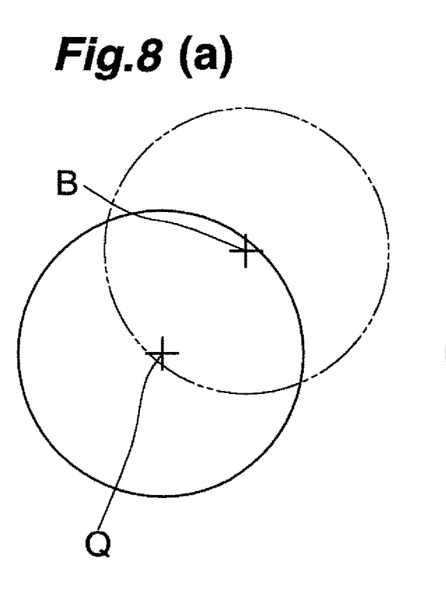
FIGS. 8(a) and 8(b) are schematic diagrams showing a problem of a method of measuring a printing misalignment value in a conventional printing apparatus.

However, as shown in FIG. 8(b), the printing misalignment inspection mark (A) that is actually printed has a marginal portion M that protrudes from the perfect circle that is the set value. This marginal portion M may cause the results of operation for the center position to deviate from a value B to be obtained originally. Specifically stated, an actual position obtained from the operation may deviate from B to B' due to the marginal portion M. Adjusting the position of the plate cylinder (47) in the axial and circumferential directions so as to use B' for causing B' to come closer to Q, causes a problem that the misalignment amount obtained differs from the actual misalignment amount. Since the marginal portion M is subject to influence of pressure of the plate cylinder, ink amount, temperature, and the like, it is practically difficult to set the marginal portion M in advance for operation.

Figure 1:
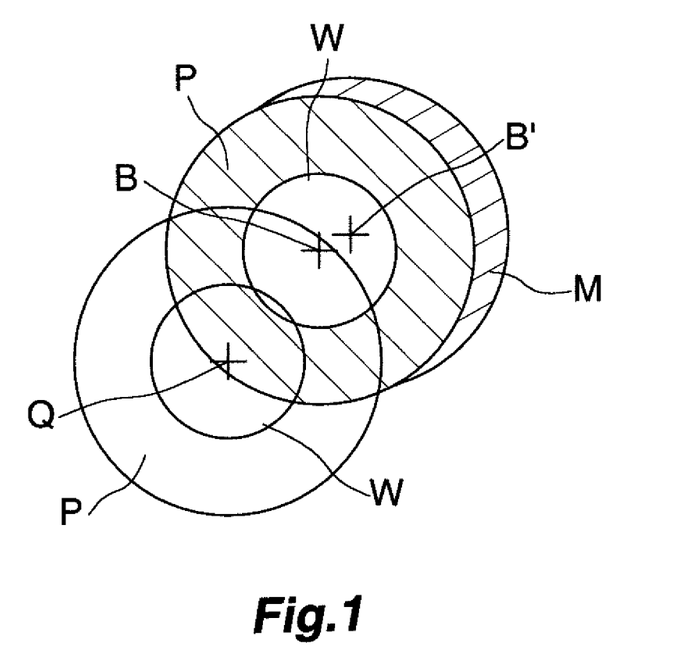
FIG. 1 is a schematic diagram describing a method of measuring a printing misalignment value in a printing apparatus in accordance with the present invention.

To address this issue, in a method of measuring the printing misalignment value in the printing apparatus according to the present invention, a non-print portion W is provided at a center portion of a circle defining the printing misalignment inspection mark (A), as shown in FIG. 1. This printing misalignment inspection mark (A) is a hollow circle that is white inside, consisting of a white portion W and a print portion P located outside the white portion W. Detection of the center position of the printing misalignment inspection mark (A) is performed by using the white portion W. The margin is substantially zero on the inner circumferential side of the print portion P. This allows positional adjustment of the plate cylinder (47) in the axial and circumferential directions by using B instead of B' so as to cause B to come closer to Q, even in the case where the center position of the entire printing misalignment inspection mark (A) that includes the marginal portion M deviates to B'. Accordingly, the problem that the misalignment amount obtained differs from the actual misalignment amount is solved, whereby accuracy of correcting the printing misalignment is greatly improved.

The printing misalignment inspection mark (A) is thus provided with the white portion W, whereby ink amount for the printing misalignment inspection mark (A) is reduced and therefore the marginal portion M is reduced, which leads to improvement of the accuracy of correcting the printing misalignment.

The marginal portion M is changed depending on the print condition, and for example, may have the shape of an approximately crescent. Regarding the printing misalignment inspection mark (A) that has a hollow portion as described above, a circle defining the print portion P having the center at the center position B of the white portion W is used as a reference in FIG. 1, whereby the position (in which direction the marginal portion M protrudes), the size (height, width, area, and the like), or the like, of the marginal portion M having the shape of an approximately crescent may be determined. The marginal portion M is subject to influence of pressure of the plate cylinder, ink amount, temperature, and the like, and therefore, by detecting and monitoring the marginal portion M as described above, information as to whether the print condition is appropriate or not may also be obtained, whereby improvement of the print quality is achieved.

Although, in the above description, the printer (2) that performs printing on cans (C) is described as an example, the method of measuring the printing misalignment value in the printing apparatus according to the present invention may be applicable to printers (such as an offset printer and a letterpress printer) that perform printing on paper.

INDUSTRIAL APPLICABILITY

When adopting the present invention, registration accuracy in the printing apparatus is improved and therefore the printing misalignment is corrected with higher accuracy, which contributes to the improvement of the printing accuracy.

The invention claimed is:

1. A method of correcting printing misalignment in a printing apparatus,
    the printing apparatus comprising:
        a printer having a plurality of plate cylinders for printing different colors, the printer configured to perform printing on an object;
        an imaging device configured to take an image that has been printed on the object;
        a plurality of printing misalignment inspection marks that correspond to each of the plurality of plate cylinders for printing different colors respectively; and
        an image processor configured to process the taken image, the image processor having printing misalignment value measurement means configured to measure a misalignment value with respect to a set position of each printing misalignment inspection mark that has been printed on the object,
    wherein each printing misalignment inspection mark is a hollow circle that is white inside, and the printing misalignment value measurement means measures the misalignment value with respect to the set position by using a white portion of each printing misalignment inspection mark.

2. The method of correcting printing misalignment in the printing apparatus according to claim 1,
    wherein the printing misalignment value measurement means determines a position and a size of a marginal portion by using a circular print portion that is located outside the white portion of the printing misalignment inspection mark.

3. The method of correcting printing misalignment in the printing apparatus according to claim 1,
    wherein the object on which printing is performed is a can.

4. The method of correcting printing misalignment in the printing apparatus according to claim 2,
    wherein the object on which printing is performed is a can.

5. The method of correcting printing misalignment in the printing apparatus according to claim 1,
    wherein the hollow circle of each printing misalignment inspection mark is a same size.

6. The method of correcting printing misalignment in the printing apparatus according to claim 1,
    wherein the hollow circle has an outer diameter that is larger than an outer diameter of the white portion, and
    wherein the misalignment value is measured by determining a center position of the white portion using the outer diameter of the white portion and comparing the center position to the set position.

7. The method of correcting printing misalignment in the printing apparatus according to claim 1,
wherein the misalignment value is measured by determining a center position of the white portion in the taken image and comparing the center position to the set position on a master image.

8. The method of correcting printing misalignment in the printing apparatus according to claim 1,
wherein the white portion has an outer diameter that is 30% to 70% of an outer diameter of the hollow circle.

9. The method of correcting printing misalignment in the printing apparatus according to claim 1,
wherein the white portion has an outer diameter that is 40% to 60% of an outer diameter of the hollow circle.

10. The method of correcting printing misalignment in the printing apparatus according to claim 1,
wherein the white portion is a non-printed portion.

11. The method of correcting printing misalignment in the printing apparatus according to claim 2,
wherein the marginal portion is a deformation in the printing of the hollow circle along an outer periphery of the circular print portion.

12. A method of correcting printing misalignment in a printing apparatus, the method comprising:
printing a plurality of misalignment inspection marks on an object using a plurality of plate cylinders for printing different colors, the plurality of printing misalignment inspection marks correspond to each of the plurality of plate cylinders for printing different colors respectively, each printing misalignment inspection mark being a hollow circle that a non-printed portion inside;
taking an image of the plurality of misalignment inspection marks printed on the object; and
measuring, using the image, a misalignment value with respect to a set position of each printing misalignment inspection mark that has been printed on the object, the misalignment value being measured with respect to the set position by using the non-printed portion of each printing misalignment inspection mark.

13. The method of correcting printing misalignment in the printing apparatus according to claim 12, further comprising:
performing positional adjustment of the plurality of plate cylinders using the misalignment value.

14. The method of correcting printing misalignment in the printing apparatus according to claim 12, further comprising:
determining a position and a size of a marginal portion by using a circular print portion that is located outside the non-printed portion of the printing misalignment inspection mark.

15. The method of correcting printing misalignment in the printing apparatus according to claim 14,
wherein the marginal portion is a deformation in the printing of the hollow circle along an outer periphery of the circular print portion.

16. The method of correcting printing misalignment in the printing apparatus according to claim 12,
wherein the hollow circle of each printing misalignment inspection mark is a same size.

17. The method of correcting printing misalignment in the printing apparatus according to claim 12,
wherein the hollow circle has an outer diameter that is larger than an outer diameter of the non-printed portion, and
wherein the misalignment value is measured by determining a center position of the non-printed portion using the outer diameter of the non-printed portion and comparing the center position to the set position.

18. The method of correcting printing misalignment in the printing apparatus according to claim 12,
wherein the misalignment value is measured by determining a center position of the non-printed portion in the taken image and comparing the center position to the set position on a master image.

19. The method of correcting printing misalignment in the printing apparatus according to claim 12,
wherein the non-printed portion has an outer diameter that is 30% to 70% of an outer diameter of the hollow circle.

20. The method of correcting printing misalignment in the printing apparatus according to claim 12,
wherein the non-printed portion has an outer diameter that is 40% to 60% of an outer diameter of the hollow circle.

* * * * *